United States Patent [19]
Reinhard et al.

[11] 3,718,695
[45] Feb. 27, 1973

[54] PURIFYING BIS(PERFLUOROALKYL) NITROXIDE

[75] Inventors: Russell R. Reinhard, Hopewell Junction, N.Y.; William D. Blackley, Lake Elmo, Minn.

[73] Assignee: Texaco Inc., New York, N.Y.

[22] Filed: Feb. 11, 1971

[21] Appl. No.: 114,713

Related U.S. Application Data

[62] Division of Ser. No. 811,119, March 27, 1969, Pat. No. 3,644,449.

[52] U.S. Cl.................260/583 D, 260/647, 260/701
[51] Int. Cl.................................................C07c 87/22
[58] Field of Search...................260/583 D, 647, 701

[56] References Cited

UNITED STATES PATENTS 3,200,158   8/1965   Blackley...............................260/647
3,213,009   10/1965   Crawford, Jr......................260/647 X
3,253,015   5/1966   Hoffmann.....................260/583 D X

*Primary Examiner*—Leland A. Sebastian
*Attorney*—K. E. Kavanagh et al.

[57] ABSTRACT

A method of purifying crude bis(perfluoroalkyl) nitroxide comprising contacting said crude nitroxide with mercury at a temperature between about −10 and 35°C. utilizing a reactant mole ratio of crude nitroxide of said mercury to said crude nitroxide of between about 1:10 and 100:1 to form a bis(perfluoroalkyl) nitroxide mercuride intermediate, separating said mercuride, and heating said separated mercuride at between about 50 and 100°C. to reform said mercury and bis(perfluoroalkyl) nitroxide and separating the reformed nitroxide from the reformed mercury.

2 Claims, No Drawings

PURIFYING BIS(PERFLUOROALKYL) NITROXIDE

This is a division of Ser. No. 811,119, filed Mar. 27, 1969, now U.S. Pat. No. 3,644,449.

BACKGROUND OF INVENTION

Bis(perfluoroalkyl) nitroxides and their method of manufacture are described in U.S. Pat. No. 3,200,158 and are characterized by the formula $(R_f)_2NO\cdot$ where $R_f$ is a perfluoro-saturated aliphatic radical of from 1 to 12 carbons. They are further described in the patent as paramagnetic (free radical) compounds which are particularly useful as inhibitors in polymerization reaction, and therefore, suitable as stabilizers in amounts of between 0.001 and 2 wt. % in nylon and rubber compositions.

Although the bis(perfluoroalkyl) nitroxides are relatively stable, they do tend to deteriorate after extended periods of storage at the warmer atmospheric temperatures. Further, the lower molecular weight nitroxides are gases or liquids at room temperature which forms by their nature require more costly storage facilities than the solid form. It is, therefore, desirable to develop a means of storing the defined bis(perfluoroalkyl) nitroxides in solid form over lengthy periods such as several months without any significant deterioration, that is, less than 1 wt. percent decomposition.

SUMMARY OF INVENTION

We have discovered, and this constitutes our invention, a novel product, namely, bis(perfluoroalkyl) nitroxide mercuride characterized by the formula $[(R_f)_{Ax}{}^{NO}]_x Hg$ where $x$ is 1 to 2 prepared by contacting under conditions of agitation paramagnetic bis(perfluoroalkyl) nitroxide of the formula $(R_f)_2NO\cdot$ at a temperature between about $-10°$ and $35°C$.

The bis(perfluoroalkyl) nitroxide mercurides have the properties of being a solid and of greater stability (up to 50°C.) than their bis(perfluoroalkyl) nitroxide precursors yet readily regenerable into the corresponding precursor and mercury at temperatures of above 50° and up to 100°C. and higher. Therefore, the formation of the mercury adduct of bis(perfluoroalkyl) nitroxide is a convenient way of storing bis(perfluoroalkyl) nitroxide for long periods of time under extremely stable conditions. Further, as an ancillary benefit, the procedure of converting the bis(perfluoroalkyl) nitroxide to the mercury adduct and then regenerating the adduct to its nitroxide precursor facilitates purification of the nitroxide since gaseous, liquid and solid impurities can be separated therefrom when it is in its solid mercuride form.

DETAILED DESCRIPTION OF THE INVENTION

More specifically, we have found a novel compound of the formula: $[(R_f)_2NO]_x Hg$ where $R_f$ is a perfluoro-saturated aliphatic radical (perfluoroalkyl) of from one to 12 carbons and $x$ is 1 to 2. The novel compounds are prepared by the newly discovered method of contacting bis(perfluoroalkyl) nitroxide of the formula $(R_f)_2NO\cdot$ where $R_f$ is as heretofore defined with the mercury metal at a temperature of between about $-10$ and $35°C$. under conditions of agitation utilizing a mole ratio of bis(perfluoroalkyl) nitroxide to mercury of between about 10:1 and 1:100. The presence of excess mercury in respect to nitroxide reactant in the reaction system favors the production of a mercurous product, i.e., where $x=1$. In contrast, an excess of nitroxide reactant in the system favors the production of a mercuric product, i.e., where $x=2$. The reaction pressure may range from subatmospheric to superatmospheric, e.g., 1 mm. Hg. abs. to 10 atmospheres. Normally when a mercuric product is desired and the nitroxide reactant is gaseous, said reactant is desirably maintained under superatmospheric pressure in said system. The reaction period is normally between about 0.5 and 2.0 hours although a greater or lesser time may be employed depending upon the particular yield desired.

The products are silver grayish solids and are recovered from the reaction mixture by standard means such as filtration. Handling and storage of the mercuride product should be carried out in the absence of moisture or protonic acids as these cause its ready conversion to bis(perfluoroalkyl) hydroxylamine.

The mercuride adducts are regenerated into their respective mercury and nitroxide components by heating the adducts at temperatures between about 50° and 100°C. and higher, preferably between 55° and 80°C.

One of the important features in the method of the invention is the maintenance of the reaction ingredients under agitation conditions. For example, where the reaction is a liquid-gas or liquid-liquid contact, i.e., the mercury being in the liquid state and the bis(perfluoroalkyl) nitroxide in the gaseous or liquid state, sufficient agitation is normally supplied by the stirring of the liquid reactant phase even when blanketed by a gaseous reactant phase. If the reactants are not maintained in an agitated contact then the yield of product is significantly reduced. For example, when the nitroxide reactant phase is gaseous and the mercury component is not agitated, a product film is formed on the surface of the mercury preventing extensive reaction.

Examples of the bis(perfluoroalkyl) nitroxide reactants contemplated herein are bis(trifluoromethyl) nitroxide, bis(perfluoroethyl) nitroxide, bis(perfluoro-t-butyl) nitroxide, bis(perfluoro-2-methylhexyl) nitroxide, bis(perfluoroheptyl) nitroxide, and bis(perfluorododecyl) nitroxide. Corresponding adduct products are $[(R_f)_2NO]_x Hg$ where $R_f$ is trifluoromethyl, perfluoroethyl, perfluoro-t-butyl, perfluoro-2-methylhexyl, perfluoroheptyl, perfluorododecyl and where $x$ is 1 and where $x$ is 2. When $x$ is not a whole number this denotes a mixture of $x=1$ and $x=2$ product. For example, $x=1.5$ value denotes a 1:1 mole mixture of $x=1$ and $x=2$ product.

As heretofore stated, one of the ancillary benefits of the invention is the purification of bis(perfluoroalkyl) nitroxide as well as its very stable storage. This purification is accomplished by sequentially converting the bis(perfluoroalkyl) nitroxide to the mercuride isolating the mercuride, e.g., evacuating the atmosphere over the mercuride, and heating the mercuride in an evacuated container at a temperature between about 50° and 100°C. to regenerate bis(trifluoroalkyl) nitroxide and mercury which are separated, as formed, by standard means such as vacuum distillation in the case of nitroxides which are easily volatilized, and solvent extraction for higher boiling nitroxides. Various fluorohalocarbons, such as trichlorofluoromethane are convenient extractive solvents for the nitroxides.

The following examples further illustrate the products, method of preparation, regeneration and purification embodiments of the invention but are not to be construed as limitations thereof.

EXAMPLE I

This example illustrates the product and method of the invention.

A 50 ccs. round-bottomed Pyrex flask is charged with 5 ccs. of mercury and a Teflon coated magnetic stirring bar. The mercury is thoroughly degassed in the flask by the application of heat and high vacuum. With the flask at room temperature, the contained mercury is contacted with 67.2 ccs. (at 25 mm. Hg. abs) of crude gaseous bis(trifluoromethyl) nitroxide, $(CF_3)_2NOB.$. In a total system volume of 140 ccs. the pressure decreased from an original 12 mm. to 11.5 mm. Hg. abs. after 8 minutes without stirring of the mercury. Subsequent stirring of the mercury by the magnetic bar is accompanied by a decrease in the system pressure from 11.5 mm. to 2 mm. Hg. abs. and the formation of silver gray solid suspended in the excess mercury. The silver gray solid is analyzed and found to be bis(trifluoromethyl) nitroxide mercuride of the formula $[(CF_3)_2NO]_xHg.$ where $x$ is 1.

EXAMPLE II

This example illustrates the reversible nature of the nitroxide-mercury reaction.

A 50 ccs. round-bottomed Pyrex flask is charged with 3 ccs. of purified mercury and a Teflon coated stirring bar. After degassing the mercury, it is contacted with gaseous $(CF_3)_2NO\cdot$ (67.2 ccs. at 100 mm. Hg. abs.) at 25°C. for 100 minutes with stirring. The unreacted gases (44 mm. Hg. abs. in 140 ccs.) are evacuated from the resulting silver gray solid suspended in excess mercury. The solid product is identified as $[(CF_3)_2NO]_xHg.$ where $x$ is 1 having a heat of dissociation of 17.6 kcal./mole. The product is heated to 123°C. and the products resulting from the heating are analyzed and determined to include mercury and bis(trifluoromethyl) nitroxide.

EXAMPLE III

This example illustrates the preparation and use of the mercuride product $[(R_f)_2NO]_xHg.$ as a convenient source of its nitroxide precursor $(R_f)_2NO\cdot$ in purified form.

A 50 ccs. round-bottomed Pyrex flask is charged with 5 ccs. of purified mercury and the whole is carefully degassed and dried under high vacuum. Crude bis(trifluoromethyl) nitroxide (109 mm. Hg. abs. in 67.2 ccs.) is introduced into the flask while stirring the mercury at 25°C. After one hour, essentially all of the nitroxide is reacted and the $CO_2$, $N_2O$, $CF_4$, $CF_3NO_2$, $CF_3N=CF_2$, and $(CF_3)_2NOH$ impurities associated with the crude nitroxide reactant are removed by the application of high vacuum to the reactor flask leaving a silver gray solid residue which is determined to be $[(CF_3)_2NO]_xHg.$ where $x$ is 1. Heating the flask at 65° to 70°C. for 30 minutes while stirring the contents and evacuating through a liquid nitrogen cooled cold trap decomposes the silver gray product in the flask and yields a yellow solid in the cold trap which on warming to room temperature amounts to 67.2 ccs. (98 mm. Hg. abs.) of $(CF_3)_2NO\cdot$ which shows no impurities by infrared or gas chromatographic analysis.

The above procedure is repeated with the exception the nitroxide is introduced under 10 atmospheres into a pressure flask in mole excess of the mercury present. The results are the same except the solid residue is determined to be $[(CF_3)_2NO]_xHg.$ where $x$ is 2.

EXAMPLE IV

This example illustrates the preparation of the mercuride product from impure nitroxide and the regeneration of purified nitroxide from the solid mercuride product.

A 50 ccs. round-bottomed Pyrex flask is charged with 5 ccs. of purified mercury and a magnetic stirring bar. After degassing under high vacuum, the mercury is contacted while stirring with impure $(CF_3)_2NO\cdot$ (109 mm. Hg. bas.). After stirring 19 minutes at room temperature, the residual gas is condensed in the flask at $-196°C$. On warming and after stirring for another 5 minutes, only 1 mm. Hg. abs. of residual gas remained in the system (140 ccs.). The flask is evacuated and is then heated at 65° to 70°C. while pumping the evolved gases through a liquid nitrogen cooled trap. After all the gray solid in the flask is decomposed and only a thin dark film remains on the mercury pool, the liquid nitrogen cooled cold trap is isolated and is warmed to yield a purple gas (98 mm. Hg. abs.) which is shown to be pure $(CF_3)_2NO\cdot$ by infrared analysis.

We claim:

1. A method of purifying crude bis(perfluoroalkyl) nitroxide of the formula $(R_f)_2NO\cdot$ where $R_f$ is perfluoroalkyl of from one to 12 carbons comprising contacting said crude bis(perfluoroalkyl) nitroxide with mercury under conditions of agitation at a temperature between about $-10°$ and 35°C. utilizing a reactant mole ratio of said mercury to said crude bis(perfluoroalkyl) nitroxide of between about 1:10 and 100:1 to form bis(perfluoroalkyl) nitroxide mercuride of the formula $[(R_f)_{Ax}{}^{NO}]_xHg$ where said $R_f$ is as heretofore defined and $x$ is an integer from 1 to 2 inclusively, separating said mercuride from the reaction mixture, heating said separated mercuride at a temperature of between about 50° and 100°C. to reform said mercury and said bis(perfluoroalkyl) nitroxide of the formula $(R_f)_2NO\cdot$ and separating said reformed nitroxide in a purified state from said reformed mercury.

2. A method in accordance with claim 1 wherein said $R_f$ is perfluoromethyl and said $x$ is 1.

* * * * *